INVENTOR.
NORMAN P. HUFFNAGLE

INVENTOR.
NORMAN P. HUFFNAGLE
BY
ATTORNEYS

United States Patent Office 3,405,312
Patented Oct. 8, 1968

3,405,312
TRANSISTORIZED OSCILLOSCOPE
Norman P. Huffnagle, Box B–4, 607 W. 11th St.,
Panama City, Fla. 32401
Filed June 29, 1965, Ser. No. 468,176
9 Claims. (Cl. 315—25)

ABSTRACT OF THE DISCLOSURE

An oscilloscope system having an input with a vertical amplifier and a horizontal amplifier effectively connected thereto. A vertical voltage doubling paraphase circuit is connected to the output of the vertical amplifier, and a series connected horizontal sweep circuit and horizontal voltage doubling paraphase circuit are connected to the output of the horizontal amplifier. The vertical and horizontal deflection plates of a cathode ray tube readout are respectively connected to the outputs of the aforesaid vertical and horizontal voltage doubling paraphase circuits.

---

The invention described herein may be manufactured and used by or for the Government of the United States of America for governmental purposes without the payment of any royalties thereon or therefor.

The present invention relates generally to instruments for measuring and displaying electrical signals and in particular is a simplified portable type oscilloscope system containing transistorized circuitry having low power supply requirements.

In the past, it has ordinarily been necessary to use complex electronic circuitry containing copious quantities of different electron tubes and/or transistors. The power requirements to operate such circuits were usually large, and the resulting structural configurations of such oscilloscopes were usually large, heavy, expensive, and burdensome to transport from place to place and sometimes difficult to use. Although practical for many purposes, they often left a great deal to be desired, especially when portability was an important factor to be considered.

The instant invention overcomes most of the disadvantages of the prior art devices of similar nature in that it is compact, light weight, easy to manually transport, easy to use and operate, and requires a relatively low power supply, due to the fact that a unique, simplified transistorized circuit is incorporated therein.

It is, therefore, an object of this invention to provide an improved transistorized oscilloscope system.

Another object of this invention is to provide a relatively compact, easily portable oscilloscope system.

Still another object of this invention is to provide a transistorized oscilloscope circuit which requires only a low voltage power supply.

A further object of this invention is to provide an accurate, efficient, relatively simple transistorized oscilloscope circuit which is easily and economically manufactured, operated, stored, and maintained.

Another object of this invention is to provide an improved oscilloscope which is manually portable and may be battery powered.

Figure 1:
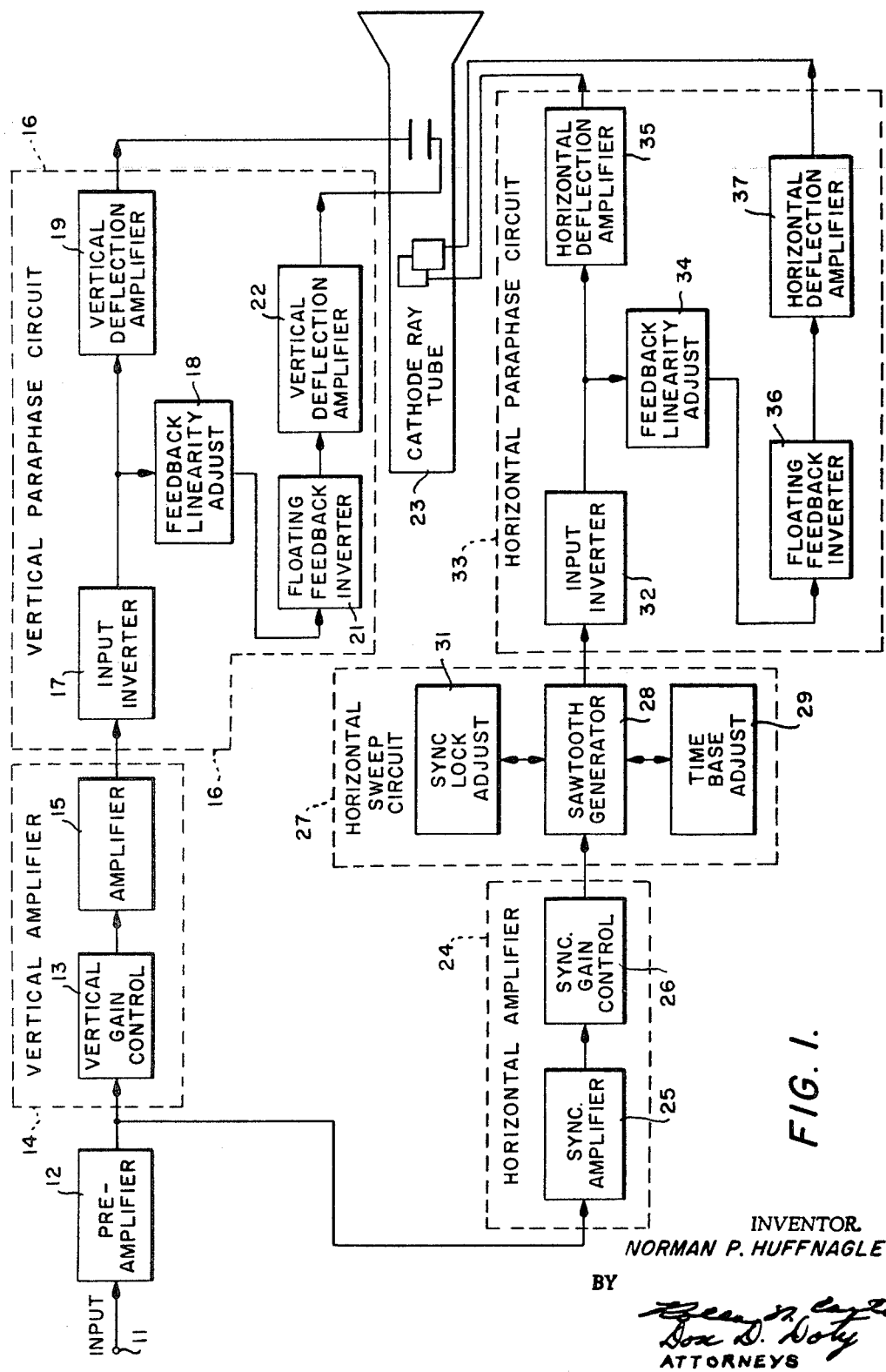
Figure 2:
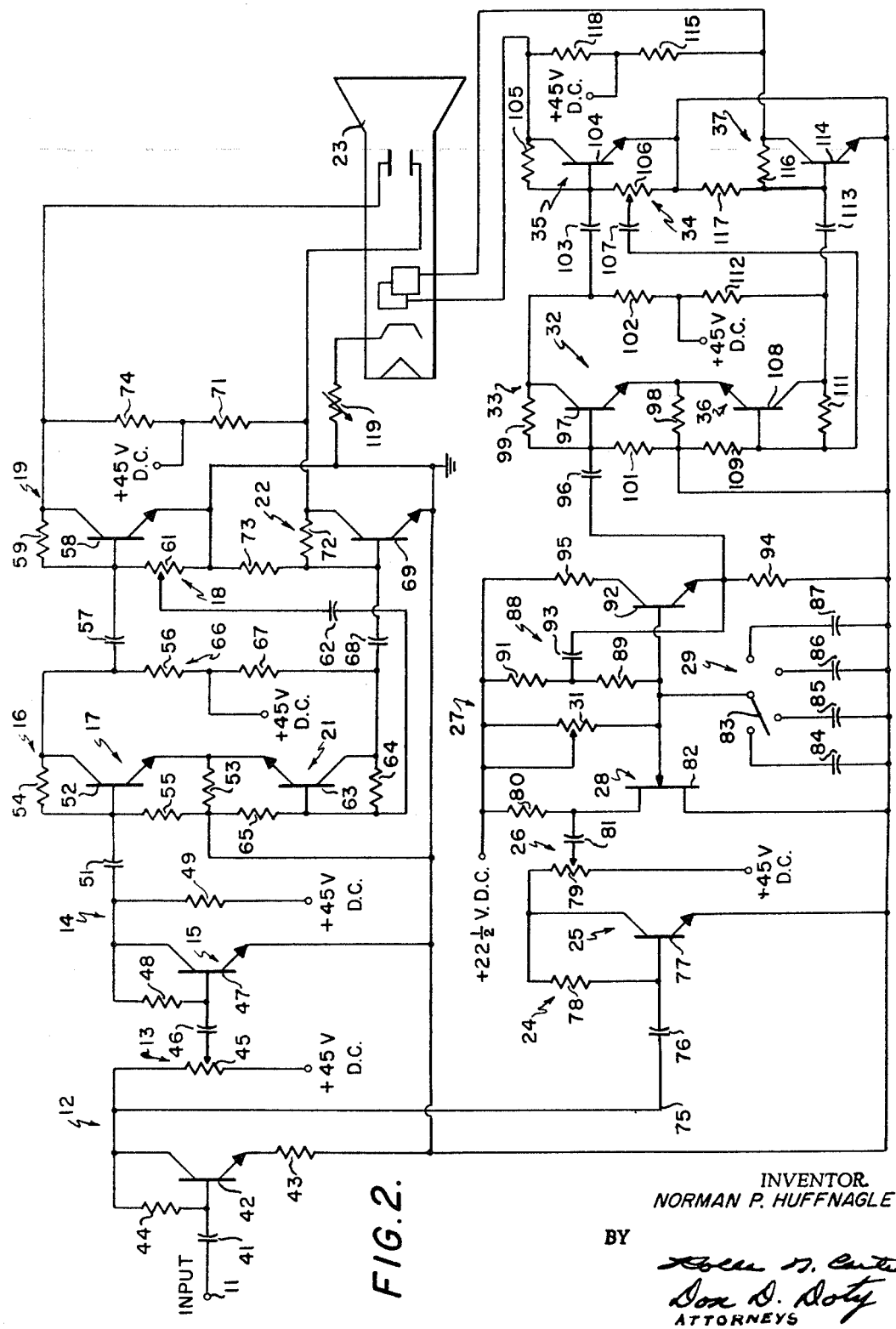

Other objects and many of the attendant advantages will be readily appreciated as the subject invention becomes better understood by reference to the following detailed description when considered in conjunction with the accompanying drawings wherein:

FIG. 1 is a block diagram of the subject invention;
FIG. 2 is a detailed schematic electrical diagram of a preferred embodiment of the subject invention.

Referring now to FIG. 1, there is shown a preferred embodiment of the invention as having an input terminal 11 connected to a preamplifier 12, the output of which is connected to a vertical gain control element 13 of a vertical amplifier 14. The output of vertical gain control 13 is coupled to a first amplifier 15, the output of which constitutes the output of the aforesaid vertical amplifier 14.

The output of said first amplifier 15 and, consequently, said vertical amplifier 14, is coupled to the input of a vertical paraphase circuit 16. Actually, the input of said vertical paraphase circuit 16 is an input inverter 17, and the output thereof is connected to a feedback and linearity adjust circuit 18. The output of input inverter 17 is also coupled to the input of a vertical deflection amplifier 19. The output of said feedback linearity adjust 18 is connected to the input of a floating feedback inverter 21, and the output thereof is connected to a vertical deflection amplifier 22.

The outputs of the aforesaid vertical deflection amplifiers 19 and 22, respectively, constitute the outputs of the aforesaid vertical paraphase circuit 16 and are connected to the vertical deflection plates of a cathode ray tube 23. Cathode ray tube 23 is one which may be selected from several conventional types but is preferably a 1CP1 type.

The output of the aforementioned preamplifier 12 is also coupled to the input of a horizontal amplifier 24, said input being, in this particular instance, a synchronizing amplifier 25. The output of synchronizing amplifier 25 is coupled to a synchronizing gain control 26, the output of which constitutes the output of the aforementioned horizontal amplifier 24.

The output of synchronizing gain control 26 is coupled to the input of a unique horizontal sweep circuit 27 of the type disclosed in previously filed patent application, Ser. No. 402977, filed Oct. 9, 1964, entitled Sawtooth Signal Generator by Norman P. Huffnagle. Although this unique horizontal sweep circuit is considered to be an optimizing feature for this particular embodiment of the subject invention, it should be understood that other more conventional horizontal sweep circuits may be substituted therefor if so desired, in view of the teachings herein presented, inasmuch as so doing would ostensively be well within the purview of one skilled in the art.

The output of the aforesaid synchronizing gain control 26 and, hence, said horizontal amplifier 24 as well, is actually coupled to the input of a relaxation oscillator type sawtooth generator 28 located within unique horizontal sweep circuit 27. A time base adjust circuit 29 is connected to said sawtooth generator 28 for the purpose of making a coarse selection of the frequency at which said sawtooth generator 28 is to operate, and a synchronizing lock adjust circuit 31 is likewise connected to the aforesaid sawtooth generator 28 for the purpose of making a fine frequency adjustment thereto and so as to effectively form a synchronizing lock with any desired portion of the input signal supplied to the subject invention.

The output of sawtooth generator 28, of course, constitutes the output of horizontal sweep circuit 27 and is coupled to an input inverter 32 which likewise constitutes the input to a horizontal paraphase circuit 33. As may readily be seen, horizontal paraphase circuit 33 is substantially identical to the aforementioned vertical paraphase circuit 16, as far as electrical circuitry is concerned. Input inverter 32 of horizontal paraphase circuit 33 has its output connected to a feedback and linear adjust circuit 34 and the input of a horizontal deflection amplifier 35. The output of feedback linear adjust 34 is coupled to the input of a floating feedback inverter 36, and the output of floating feedback inverter 36 is then coupled to the input of another horizontal deflection amplifier 37. The outputs of the aforementioned horizontal deflection amplifiers 35 and 37, of course, constitute the outputs of said horizontal paraphase circuit 33 and are respectively connected to the horizontal deflection plates of the aforesaid cathode ray tube 23.

Referring now to FIG. 2, wherein there is shown in detail the elements illustrated in block diagram form in FIG. 1. Accordingly, like elements of FIGS. 1 and 2 have been given like reference numerals, in order to correlate and simplify the electrical structure disclosures of the two figures.

FIG. 2 illustrates that the subject invention contains an input terminal 11 to which is applied any electrical signal intended to be measured and/or pictorially displayed. Terminal 11 is coupled through a coupling capacitor 41 to the base of a 2N343 transistor 42 located in the aforementioned preamplifier 12. The emitter of transistor 42 is coupled through a resistance 43 to a ground, and the collector thereof is connected through a resistor 44 to the base thereof. The collector of transistor 42 is likewise connected through the resistance portion of a potentiometer 45 to a +45 volt direct current B+ voltage. Of course, in effect, the aforesaid potentiometer 45 also constitutes the aforementioned vertical gain control 13 of vertical amplifier circuit 14. The output thereof is taken from the slide arm thereof and is coupled through a coupling capacitance 46 to the base of another 2N343 transistor 47 located in the aforementioned first amplifier circuit 15. The emitter of transistor 47 is directly connected to said ground, and the collector thereof is coupled through a resistor 48 to the aforesaid base thereof. The collector of transistor 47 is also coupled through another resistor 49 to a 45 volt direct current B+ voltage.

The output of first amplifier 15 and, hence, of vertical amplifier 14 is taken from the collector of transistor 47 and is supplied through a coupling capacitor 51 to the base of another 2N343 transistor 52 located within the aforementioned input inverter 17 of vertical paraphase circuit 16. The emitter of transistor 52 is coupled through a resistance 53 to said ground, and the collector thereof is coupled through a resistor 54 to the base thereof, which, in turn, is also coupled through another resistance 55 to said ground. The collector of transistor 52 is coupled through a resistor 56 to a 45 volt direct current B+ voltage.

The output of input inverter 17 is, in fact, taken from the collector of transistor 52 and is supplied through a coupling capacitor 57 to the base of a 2N343 transistor 58 located in the aforesaid vertical deflection amplifier circuit 19 of the vertical paraphase circuit 16. The emitter of said transistor 58 is directly connected to ground, and the collector thereof is coupled through a resistor 59 to the base thereof, which, in turn, is also connected through the resistance portion of a potentiometer 61 to said ground.

The slider arm of potentiometer 61 is coupled through a capacitance 62 to the base of a 2N343 transistor 63. As may readily be appreciated, the aforementioned combination of potentiometer 61, capacitor 62, and the associated electrical conductor constitute the previously defined feedback and linearity adjust circuit 18. Transistor 63, of course, is located in the previously mentioned floating feedback inverter 21. The collector thereof is coupled through a resistance 64 to the base thereof, and the base thereof is also coupled through a resistance 65 to said ground. The collector of transistor 63 is also coupled through a resistance 67 to said 45 volt direct current B+ voltage, and the emitter thereof is connected to the emitter of transistor 52 and through the aforementioned resistor 53 to said ground.

The output of floating feedback inverter 21 is taken from the collector of transistor 63 and is coupled through a coupling capacitor 68 to the base of a 2N343 transistor 69 located in the aforementioned vertical deflection amplifier 22 of vertical paraphase circuit 16. The emitter of transistor 69 is directly coupled to ground, and the collector thereof is connected through a resistor 71 to a 45 volt direct current B+ voltage. The collector thereof is likewise coupled through resistor 72 to the base thereof which, in turn, is coupled through resistor 73 to said ground. The collector of said transistor 58 is also coupled through a resistor 74 to said 45 volt direct current B+ voltage.

The output of the aforementioned preamplifier 12 which, of course, is taken from the collector of said transistor 42, is also coupled to the input terminal 75 of synchronizing amplifier 25 of horizontal amplifier 24. A coupling capacitor 76 is connected between said input 75 and the base of a 2N343 transistor 77. The emitter of transistor 77 is connected to ground, and the collector thereof is connected through a resistor 78 to the base thereof and through the resistance portion of a potentiometer 79 to a +45 volt direct current B+ voltage. Of course, in actual operation, potentiometer 79 constitutes the aforementioned synchronizing gain control circuit 26 of FIG. 1.

The slider arm of potentiometer 79 constitutes the output of horizontal amplifier 24 and is connected through a coupling capacitor 81 to the input of horizontal sweep circuit 27, which, in this particular case, is the second base of a 2N1671A unijunction transistor 82 located in the relaxation oscillator of sawtooth generator 28. The first base of unijunction transistor 82 is directly connected to said ground, and the aforesaid second base thereof is also coupled through a resistor 80 to a second B+ voltage of the order of 22½ volts DC. The emitter of transistor 82 is coupled through a vernier sync lock variable resistor 31 to the aforesaid 22½ volts DC and through a course frequency selector, consisting of time base adjust 29, to ground. In actuality, the emitter of transistor 82 is connected to the slider arm of a manual selector switch 83, the stationary contacts of which are respectively connected through a plurality of capacitors 84 through 87 to said ground.

The output of the relaxation oscillator of sawtooth generator 28 is taken from the emitter of unijunction transistor 82 and is coupled through a voltage divider network 88, composed of series connected resistors 89 and 91, to said 22½ volt DC. In addition, said unijunction transistor emitter is connected to the base of a 2N343 emitter-follower transistor 92. A capacitor 93 interconnects the common junction of the aforesaid series connected resistors 89 and 91 and the emitter of transistor 92. Said emitter is also coupled through a resistor 94 to ground, and the collector thereof is coupled through a resistor 95 to said 22½ volt DC. The output of emitter-follower transistor 92 is taken from the emitter thereof and constitutes the output of the aforesaid horizontal sweep circuit 27.

The output of emitter-follower 92 is coupled through a coupling capacitor 96 to the base of 2N343 transistor 97 located in input inverter 32 of horizontal paraphase circuit 33. The emitter of transistor 97 is coupled through a resistor 98 to said ground, and the collector thereof is coupled through a resistor 99 to the base thereof which, in turn, is also coupled through another resistor 101 to the aforesaid ground. The collector of transistor 97 is also coupled through a resistor 102 to a +45 volt direct current B+ voltage, and furthermore, is coupled through a coupling capacitor 103 to the base of a 2N343 transistor 104 located in horizontal deflection amplifier 35 of horizontal paraphase circuit 33. The collector of transistor 104 is coupled through a resistor 105 to the base thereof, which, in turn, is coupled through the resistance portion of a potentiometer 106 to said ground.

The slider arm of potentiometer 106 is coupled through a capacitor 107 to the base of a 2N343 transistor 108 and through another resistor 109 to said ground. The collector of transistor 108 is connected through a resistance 111 to the base thereof and through a resistance 112 to a 45 volt direct current B+ voltage. In addition to being connected to resistor 98, the emitter of transistor 108 is connected to the emitter of transistor 97. The output of floating feedback inverter 36 is taken from the collector of transistor 108 and is supplied through a coupling capacitor 113 to the base of a 2N343 transistor 114 located in horizontal deflection amplifier 37 of horizontal paraphase circuit 33. The emitter of transistor 114 is directly connected to ground, and the collector thereof is coupled through a resistor 115 to a 45 volt direct current B+ voltage. The collector of transistor 114 is also connected through resistor 116 to the base thereof which, in turn is coupled through resistor 117 to the aforesaid resistance portion of potentiometer 106 and said ground. The emitter of transistor 104 is directly connected to ground, and the collector thereof is likewise connected through another resistor 118 to said 45 volt direct current B+ voltage.

The outputs of horizontal deflection amplifiers 35 and 37 and, hence, the outputs of horizontal paraphase circuit 33, are respectively taken from the collectors of transistors 104 and 114 and they are, as may readily be seen, directly coupled to their respective horizontal deflection plates located in cathode ray tube 23.

As previously mentioned, cathode ray tube 23 is a conventional type; hence, it may conventionally include a cathode which is connected through a brightness control variable resistance 119 to the aforesaid ground.

It should also be understood that well known conventional items such as batteries and/or power supplies, and the like, which are necessary for the operation of this invention, may be incorporated therein, although, as far as this invention is concerned, they are merely ancillary apparatus and do not per se constitute a claimed part thereof. This is true, of course, for switches and other items necessary for timely turning the subject oscilloscope on and off, etc. Inclusion of the aforementioned items would obviously be well within the purview of one skilled in the art having the benefit of the teachings herein presented.

Briefly, the operation of the subject invention will now be discussed in conjunction with FIGS. 1 and 2.

The electrical signal intended to be displayed, measured, and analyzed is applied to input terminal 11. Because such signals are usually lower than fifty volts peak to peak, some means of amplification is necessary to ultimately effect appropriate electron beam actuation and thus trace out a visual record. Accordingly, the input signal is raised to a useful level by preamplifier 12.

Preamplifier 12 is a common-emitter amplifier which contains ample emitter degeneration and local negative feedback, due to the base bias supplied by resistor 44 and the local negative feedback occurring at resistor 43. Coupling capacitor 41 is the input and direct current blocking capacitor and, therefore, should preferably be designed to have a workable frequency range of from 20 cycles per second to 100 kilocycles per second. The resistance portion of potentiometer 45 and the +45 VDC provide proper collector loading for transistor 42. The movable arm of potentiometer 45, of course, enables the manual selection of the gain to be applied to transistor 47, and when so used, it then becomes the vertical gain control for the main vertical amplifier 15. Coupling capacitor 46 is also a direct current blocking capacitor, and it provides circuit isolation for transistors 42 and 47 as well. Resistor 48 supplies negative feedback and bias for transistor 47, and resistor 49 provides the collector loading therefor, thus enabling amplifier 15 to provide the needed signal gain to drive the vertical paraphase circuit. Of course, capacitor 51 acts as a coupling capacitor and blocks the direct current flow into the vertical paraphase circuit while allowing the intelligence signal to pass thereto.

Input inverter 17 constitutes the input stage of vertical paraphase 16. It includes a common-emitter amplifier transistor 52 that is isolated from ground by resistor 53. The signal therefrom is passed by capacitor 57, and it then appears across the resistance portion of potentiometer 61 of feedback and linearity adjust circuit 18, which, when properly adjusted, sets the gain of the feedback signal that is coupled through capacitor 62 to the base of transistor 63 of floating feedback inverter 21. Resistances 54, 55, 64, and 65 supply the proper biases for transistors 52 and 63, respectively. Since it is an inherent characteristic of a common-emitter amplifier to invert the signal applied thereto, the waveform which is returned to the base of transistor 63 is 180 degrees out of phase with the input waveform.

The output signal from transistor 63 and, hence, from floating feedback inverter 21 is supplied through direct current blocking and coupling capacitor 68 to the base of transistor 69 of vertical deflection amplifier 22. Since the voltage deviations for each of deflection amplifiers 19 and 22 are substantially equal due to the aforementioned manual adjustment of linearity adjust 18, and since they are 180 degrees out of phase with each other, the total relative voltage at the output of vertical paraphase circuit 16 is doubled that from each thereof individually. As a result of this, the total deviation of the electron beam in the cathode ray tube is essentially doubled, too, allowing use of a larger screen and, thus, making signal display and analysis somewhat easier and more accurate.

Synchronizing amplifier 25 is also connected to the output of the aforesaid preamplifier 12, and it is used to provide a synchronized takeoff of the input signal and increase the gain thereof for more optimum operation. Resistor 78 sets the bias and negative feedback for transistor 77 of amplifier 25, and capacitors 76 and 81 isolate the stage. Potentiometer 79 has a resistance portion which acts as a load for transistor 77, and the movable arm thereof provides manually adjustable sync level control.

The horizontal sweep circuit includes relaxation oscillator 82 within sawtooth generator 28, which, in conjunction with the capacitors of time base adjust 29, produces the fundamental sweep frequency desired. Variable resistor 31 then provides the fine frequency adjustment necessary to permit the incoming sync signal to lock-in the sweep frequency. Resistors 89 and 91 and capacitor 93 provide the necessary feedback to enhance the stability and linearity of the output waveform. Resistor 80 acts as a current limiting device and bias for base #1 of transistor 82. Resistor 94 acts as an emitter load for emitter-follower 92, and resistor 95 acts as a collector load therefor. Emitter-follower 92, of course, acts as an isolation-buffer stage, and capacitor 96 blocks DC while allowing the signal to pass on to horizontal paraphase circuit 33.

The horizontal paraphase circuit is substantially identical to the previously described vertical paraphase circuit and, hence, operates in exactly the same way. Therefore, in order to provide simplicity of disclosure, the reader is referred to the operational description thereof.

Being connected to the horizontal deflection plates of cathode ray tube 23, the outputs of horizontal paraphase circuit 33 supply a sweep voltage thereto which, of course, properly deflects the electron beam thereof.

Obviously, many modifications and embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. An oscilloscope system comprising in combination,
    a pre-amplifier adapted for receiving an input signal to be amplified,
    a vertical amplifier coupled to the output of said pre-amplifier, a cathode ray tube having a pair of vertical deflection plates and a pair of horizontal deflection plates, vertical paraphase circuit interconnecting the output of said vertical amplifier and said vertical deflection plates of the aforesaid cathode ray tube, said vertical paraphase circuit including, a first transistor having an emitter, a collector, and a base, with the base thereof effectively connected to the output of the aforesaid vertical amplifier, a first resistor interconnecting the collector and base of said first transistor, a ground, a second resistor connected between the base of said first transistor and said ground, a second transistor having an emitter, a collector, and a base, with the emitter thereof connected to the emitter of said first transistor, a third resistor coupled between the collector and base of said second transistor, a fourth resistor coupled between the base of the second transistor and said ground, a fifth resistor connected between the interconnected emitters of said first and second transistors and said ground, a B+ voltage, a sixth resistor connecting the collector of said first transistor and said B+ voltage, a seventh resistor interconnecting the collector of said second transistor and said B+ voltage, a third transistor having an emitter, a collector, and a base, with the emitter thereof connected to said ground, a first capacitor interconnecting the collector of said first transistor and the base of said third transistor, an eighth resistor coupled between the collector and base of said third transistor, a first potentiometer having a resistance portion and an arm in slidable contact therewith, with the resistance portion thereof connected between the base of said third transistor and said ground, a second capacitor coupled between the slidable arm of said first potentiometer and the base of said second transistor, a fourth transistor having an emitter, a collector, and a base, with the emitter thereof connected to said ground, a ninth resistor coupled between the collector and base of said fourth transistor, a tenth resistor connected between the base of said fourth transistor and ground, an eleventh resistor coupled between the collector of said third transistor and said B+ voltage, a twelfth resistor coupled between the collector of said fourth transistor and said B+ voltage, and electrical conductor means respectively connected between the collectors of the aforesaid third and fourth transistors and said vertical deflection plates of the aforesaid cathode ray tube, a horizontal amplifier coupled to the output of said pre-amplifier, a horizontal sweep circuit coupled to the output of said horizontal amplifier, a horizontal paraphase circuit interconnecting the output of said horizontal sweep circuit and the horizontal deflection plates of the aforesaid cathode ray tube, said horizontal paraphase circuit including, a fifth transistor having an emitter, a collector, and a base, with the base thereof effectively connected to the output of said horizontal sweep circuit, a thirteenth resistor interconnecting the collector and base of fifth transistor, a fourteenth resistor connected between the base of said fifth transistor and the aforesaid ground, a sixth transistor having an emitter, a collector, and a base, with the emitter thereof connected to the emitter of said fifth transistor, a fifteenth resistor coupled between the collector and base of said sixth transistor, a sixteenth resistor coupled between the base of sixth transistor and said ground, a seventeenth resistor connected between the interconnected emitters of said fifth and sixth transistors and said ground, an eighteenth resistor interconnecting the collector of said fifth transistor and said B+ voltage, a nineteenth resistor interconnecting the collector of said sixth transistor and said B+ voltage, a seventh transistor having an emitter, a collector, and a base, with the emitter thereof connected to said ground, a third capacitor interconnecting the collector of said fifth transistor and the base of said seventh transistor, a twentieth resistor coupled between the collector and base of said seventh transistor, a second potentiometer having a resistance portion and an arm in slidable contact therewith, with the resistance portion thereof connected between the base of said seventh transistor and said ground, a fourth capacitor coupled between the slidable arm of said second potentiometer and the base of said sixth transistor, an eighth transistor having an emitter, a collector, and a base, with the emitter thereof connected to said ground, a twenty-first resistor coupled betwen the collector and base of said eighth transistor, a twenty-second resistor connected between the base of said eighth transistor and said ground, a twenty-third resistor coupled between the collector of said seventh transistor and said B+ voltage, a twenty-fourth resistor coupled between the collector of said eighth transistor and said B+ voltage, and another electrical conductor means respectively connected between the collectors of the aforesaid seventh and eighth transistors and the horizontal deflection plates of the aforesaid cathode ray tube.

2. An oscilloscope system consisting of:

a preamplifier, a vertical amplifier coupled to the output of said preamplifier, a first input inverter coupled to the output of said vertical amplifier, a first feedback linearity adjust means connected to the output of said first input inverter, a first floating feedback inverted coupled to the output of said first feedback linearity adjust means, a pair of vertical deflection amplifiers respectively connected to the outputs of said first input and floating feedback inverters, a horizontal amplifier coupled to the output of said preamplifier, a horizontal sweep circuit means coupled to the output of said horizontal amplifier, a second input inverter connected to the output of horizontal sweep circuit means, a second feedback linearity adjust means coupled to the output of said second input inverter, a second floating feedback inverter coupled to the output of said second feedback linearity adjust means, a pair of horizontal deflection amplifiers respectively connected to the outputs of said second input and floating feedback inverters, and a cathode ray tube having a pair of vertical beam deflection means and a pair of horizontal beam deflection means, with the vertical deflection means thereof respectively connected to the outputs of the aforesaid pair of vertical deflection amplifiers and with the horizontal deflection means thereof respectively connected to the outputs of the aforesaid pair of horizontal deflection amplifiers.

3. The device of claim 2 wherein said vertical amplifier includes a vertical gain control.

4. The device of claim 2 wherein said horizontal amplifier includes a synchronizing amplifier and a synchronizing gain control connected thereto.

5. The device of claim 2 wherein said first and second input inverters each includes,
   a transistor having an emitter, a collector, and a base, with the base thereof adapted for receiving an input signal,
   a first resistor coupled between the collector and base of said transistor,
   a ground,
   a second resistor coupled between the base of said transistor and said ground,
   a third resistor coupled between the emitter of said transistor and said ground,
   a B+ voltage, and
   a fourth resistor connected between the collector of said transistor and said B+ voltage.

6. The device of claim 2 wherein said first and second floating feedback inverters each includes,
   a transistor having an emitter, a collector, and a base, with the base thereof adapted for receiving an input signal,
   a first resistor coupled between the collector and base of said transistor,
   a ground,
   a second resistor coupled between the base of said transistor and said ground,
   a third resistor coupled between the emitter of said transistor and said ground,
   a B+ voltage, and
   a fourth resistor connected between the collector of said transistor and said B+ voltage.

7. The device of claim 2 wherein said first and second feedback linearity adjust means each includes,
   a potentiometer having a resistance portion and an arm in slidable contact therewith,
   a first capacitor connected to one terminal of the resistance portion of said potentiometer,
   a ground coupled to the other terminal of the resistance portion of said potentiometer, and
   a second capacitor connected to the arm of the aforesaid potentiometer.

8. The device of claim 2 wherein said vertical and horizontal deflection amplifiers each includes,
   a transistor having an emitter, a collector, and a base, with the base thereof adapted for receiving the input signal to be amplified,
   a first resistor interconnecting the collector and base of said transistor,
   a ground coupled to the emitter of said transistor,
   a second resistor connected between the base and emitter of said transistor,
   a B+ voltage, and
   a third resistor connected between the collector of said transistor and the aforesaid B+ voltage.

9. A voltage doubling paraphase circuit comprising in combination,
   a first transistor having an emitter, a collector, and a base, with the base thereof adapted for receiving an input signal,
   a first resistor interconnecting the collector and base of said first transistor,
   a ground,
   a second resistor connected between the base of said first transistor and said ground,
   a second transistor having an emitter, a collector, and a base, with the emitter thereof connected to the emitter of said first transistor,
   a third resistor coupled between the collector and base of said second transistor,
   a fourth resistor coupled between the base of said second transistor and said ground,
   a fifth resistor connected between the interconnected emitters of said first and second transistors and said ground,
   a B+ voltage,
   a sixth resistor interconnecting the collector of said first transistor and said B+ voltage,
   a seventh resistor interconnecting the collector of said second transistor and said B+ voltage,
   a third transistor having an emitter, a collector, and a base, with the emitter thereof connected to said ground,
   a first capacitor interconnecting the collector of said first transistor and the base of said third transistor,
   an eighth resistor coupled between the collector and base of said third transistor,
   a potentiometer having a resistance portion and an arm in slidable contact therewith, with the resistance portion thereof connected between the base of said third transistor and said ground,
   a second capacitor coupled between the slidable arm of said potentiometer and the base of said second transistor,
   a fourth transistor having an emitter, a collector, and a base, with the emitter thereof connected to said ground,
   a ninth resistor coupled between the collector and base of said fourth transistor,
   a tenth resistor connected between the base of said fourth transistor and said ground,
   an eleventh resistor coupled between the collector of said third transistor and said B+ voltage,
   a twelfth resistor coupled between the collector of said fourth transistor and said B+ voltage, and
   electrical conductor means respectively connected to the collectors of the aforesaid third and fourth transistors for providing the outputs of said voltage doubling paraphase circuit.

References Cited

UNITED STATES PATENTS 2,762,874   9/1956   Barco.
3,204,144   8/1965   Deavenport _____ 324—121 X RODNEY D. BENNETT, *Primary Examiner.*

T. H. TUBBESING, *Assistant Examiner.*